May 13, 1958 S. H. NORTON 2,834,096
METHOD OF MAKING PISTON RING STOCK
Original Filed Aug. 18, 1949 7 Sheets-Sheet 1

Fig. 1

Inventor
Samuel H. Norton
by
Attys

May 13, 1958 S. H. NORTON 2,834,096
METHOD OF MAKING PISTON RING STOCK
Original Filed Aug. 18, 1949 7 Sheets-Sheet 3

Inventor
Samuel H. Norton
by
Attys

May 13, 1958     S. H. NORTON     2,834,096
METHOD OF MAKING PISTON RING STOCK
Original Filed Aug. 18, 1949     7 Sheets-Sheet 4

Fig. 5

Inventor
Samuel H. Norton
by
Attys

May 13, 1958 S. H. NORTON 2,834,096
METHOD OF MAKING PISTON RING STOCK
Original Filed Aug. 18, 1949 7 Sheets-Sheet 7

Inventor
Samuel H. Norton
by Attys

United States Patent Office 2,834,096
Patented May 13, 1958

2,834,096

METHOD OF MAKING PISTON RING STOCK

Samuel H. Norton, University Heights, Ohio, assignor to Thompson Products, Inc., Cleveland, Ohio, a corporation of Ohio Original application August 18, 1949, Serial No. 111,311, now Patent No. 2,699,209, dated January 11, 1955. Divided and this application April 10, 1953, Serial No. 347,868

1 Claim. (Cl. 29—156.6)

The invention relates to improvements in methods for forming piston ring stock from flat continuous strip piston ring material, and is a division of application Serial No. 111,311 filed on August 18, 1949, now Patent No. 2,699,209.

A principal object of my invention is to provide a new and improved method for forming from flat continuous strip material, piston ring stock U-shaped in cross-section having a central slotted web and parallel spaced alternately slit crowns extending from opposite sides thereof.

A further object of my invention is to provide a new and improved method for forming U-shaped piston ring stock having a central slotted web and parallel spaced alternately slit crowns extending from opposite sides thereof in a series of intermittent operations, each one of which is simultaneously performed at different longitudinally spaced places along the strip material.

A further object of my invention is to provide a new and improved method of making a metal strip generally U-shaped in cross-section and having a ladder-like web with parallel slit legs extending from each side thereof by piercing parallel spaced slots along the center of a metal strip and supporting the unpunched portions of the strip at the advance end of the strip at longitudinally spaced areas with alternate intermediate portions of the pierced strip unsupported, shearing the unsupported portions from the supported portions and bending the unsupported portions to form tabs guiding the supported portions, and then bending the unbent portions into alignment with the bent portions.

In carrying out my invention I pierce a predetermined length of strip transversely of the strip, to form a plurality of parallel spaced cross bars. I then advance the strip an increment in length and engage the pierced portion thereof, to locate the strip and at the same time pierce a next succeeding portion of the strip. I then advance the strip a second increment in length, locate the strip by engaging the second pierced portion thereof, support the advance pierced portion of the strip at longitudinally spaced areas and leave alternate intermediate unsupported leg portions of the strip, and slit and bend the unsupported leg portions of the strip at right angles with respect to the cross-bars thereof. I feed this strip a third increment in length and again locate and pierce the strip, slit and bend the unsupported portions of the first successive section of the strip and finish bend the advance unbent legs of the strip to provide the finished product. I then successively repeat the foregoing series of piercing, locating the slitting and bending and finish bending operations, performing these operations simultaneously at different longitudinally spaced places along the strip material, to continuously fabricate the strip material into a strip of U-shaped cross section with parallel spaced cross bars and parallel slit legs extending at right angles with respect thereto. I also maintain the strip in engagement with a bending die during the slitting and bending operation thereof, and exert sufficient pressure thereagainst and against the die to straighten and maintain the strip straight.

These and other objects of my invention will appear from time to time as the following specification proceeds and with reference to the accompanying drawings wherein:

Figure 6 is an enlarged partial longitudinal sectional view taken through the center of the punch and die apparatus and showing the discharge end thereof and forming in effect a continuation of Figure 5;

Figures 3, 4:
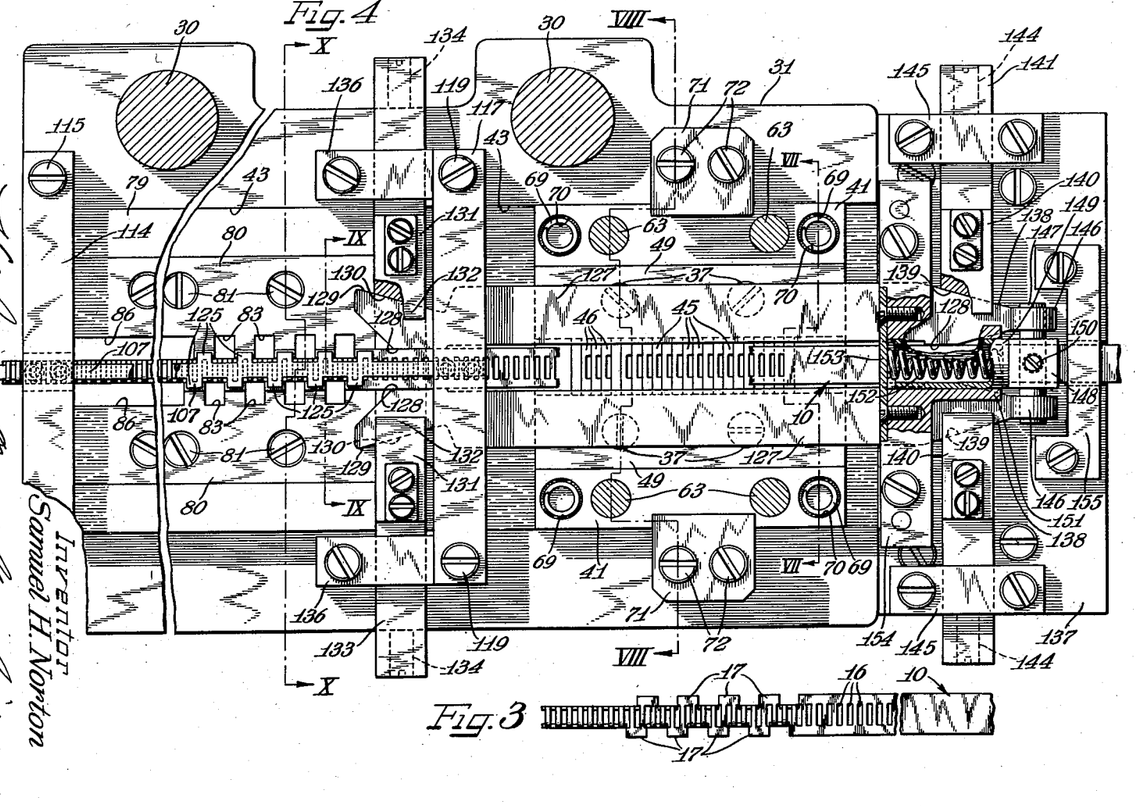
Figure 3 is a plan view of the strip piston ring material showing the various operations performed thereon and the locations along the strip at which they are performed.
Figure 4 is an enlarged plan view of the die assembly with certain parts thereof broken away and with certain other parts shown in substantially horizontal section in order to more clearly show certain details of the equalizing centering guide.

The piston ring stock 10 formed in accordance with my invention is shown in Figure 3 in its several stages of completion, all of which are effected in a single punching and forming operation from a flat strip of steel which may be high carbon steel such as SAE 1095 containing 0.95% carbon. Said strip material may be in the form of a continuous strip unwound from a reel and fed to a punch press 11 incorporating a punch and die assembly constructed in accordance with my invention, by means of a pair of intermittently rotating pinch rolls 12, 12 at the entering end of said punch press. Said pinch rolls may be driven from the mechanism for operating the punch head of the press by a ratchet mechanism indicated generally by reference character 13 and not shown in detail since it is no part of my invention. Said ratchet mechanism may be operated by an eccentric 14 and link 15 operated from the drive shaft for the punch head. The drive to said pinch rolls attained by said ratchet mechanism may be such as to feed the strip 10 after the punches have been stripped therefrom and to hold said strip from feeding movement during the punching operation.

The piston ring strip, as it enters the punch press 11, is first rectangularly pierced at various aligned points therealong to provide a series of equally spaced transverse slots 16, 16 along its center to form a ladder-like strip and leave a relatively rigid blank. The strip is then advanced through the punch and die assembly a predetermined distance and again pierced along its center. Upon the succeeding feeding operations from the second piercing operation, the portion of the strip which has previously been pierced is then alternately slit and bent downwardly, leaving alternate tabs 17, 17 extending outwardly from opposite sides of the central slotted portion thereof, and the leading portion of the strip previously pierced, slit and alternately bent downwardly is then given a finish bending operation to form piston ring stock of U-shaped formation having a central uniformly slotted web with alternately slit crowns extending therefrom in parallel relation with respect to each other. The stock so formed may then be formed into rings either directly from the punch and die assembly or from a reel (not shown) on which the completed strip stock may be coiled, in accordance with the method and apparatus disclosed in my application Serial No. 111,312, filed August 18, 1949.

Figure 1:
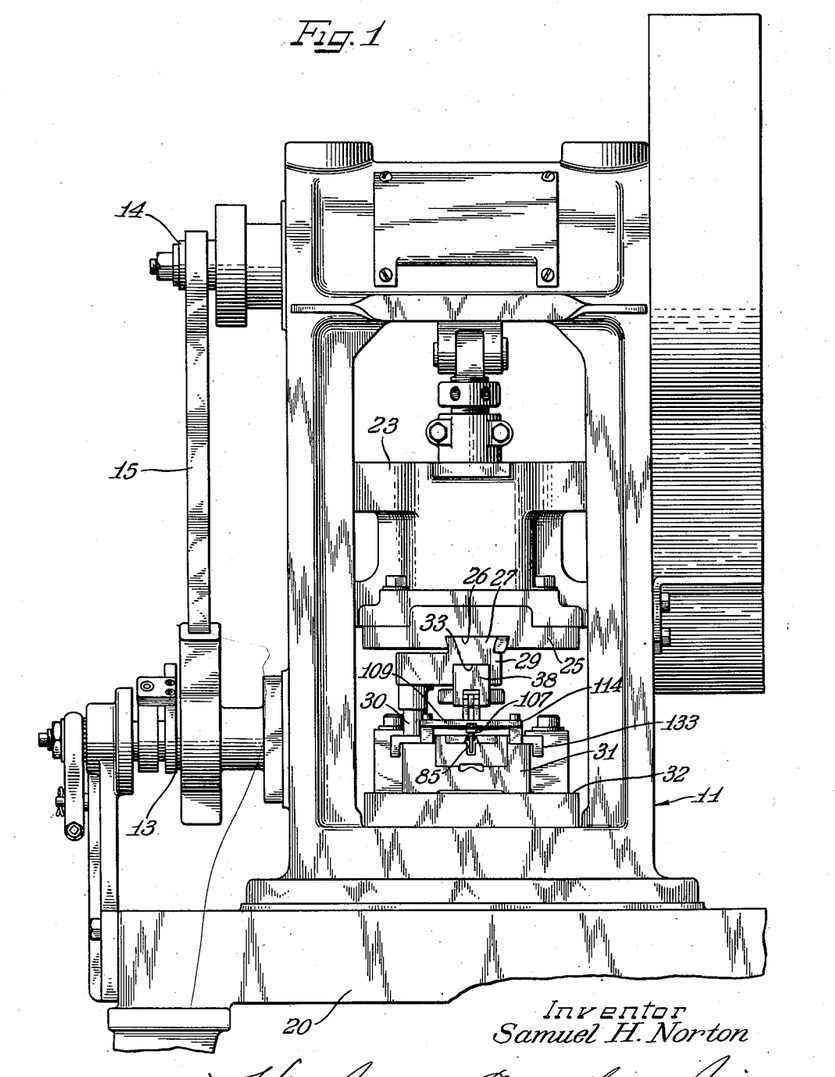
Figure 1 is a fragmentary end view of a punch press having a punch and die assembly constructed in accordance with my invention associated therewith and looking toward the discharge end of the press.
Figure 2:
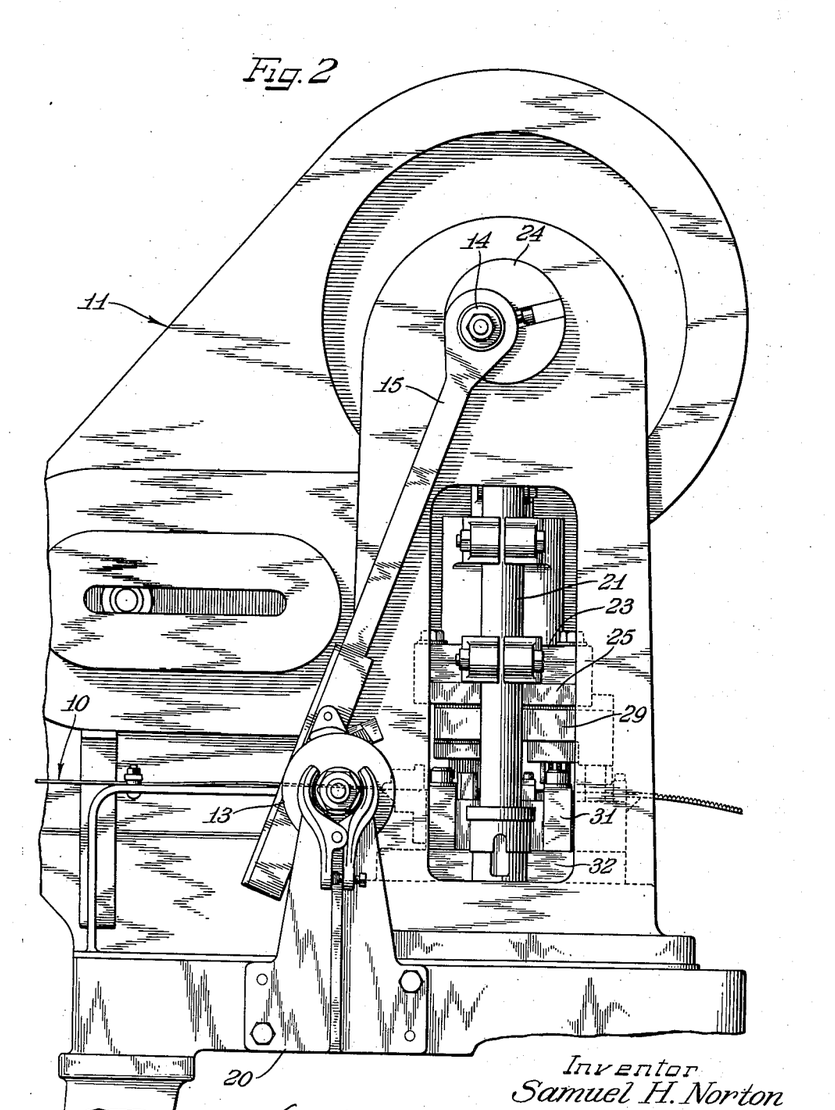
Figure 2 is a fragmentary view in side elevation of the punch press shown in Figure 1.

The punch press 11 is shown in Figures 1 and 2 as being a well known form of reciprocating press having a frame 20 with a pair of parallel spaced vertical guides 21 at the upper part thereof and forming a vertical guide for a punch head 23, reciprocably moved along said guide by a suitable reciprocating drive mechanism (not shown), and driven from a transverse shaft 24 having the eccentric 14 at one end thereof. Said punch press, punch head and reciprocating drive mechanism may be of a form well known to those skilled in the art and are no part of my present invention, so herein shown and described only in sufficient detail to make my present invention readily understandable.

The punch head 23 has a plate 25 secured to its bottom and has a female portion 26 of a dovetail guide extending longitudinally therealong and opening toward the ground. Said guide is adapted to receive a corresponding male guide portion 27 of a punch shoe 29. Said punch shoe is guided for vertical reciprocable movement on longitudinally spaced pins 30, 30 projecting upwardly from a die shoe 31. Said die shoe is mounted on and projects upwardly from a base plate or table 32 for the punch press.

The punch shoe 29 depending from the plate 25 is herein shown as having a downwardly opening channel 33 formed therein and extending longitudinally therealong from one end to the other. Said channel is adapted to receive a punch spacer 34 slotted at regular intervals to receive and space apart a plurality of piercing punches 36, 36 disposed at the entering end of the punch and die assembly, and a plurality of locating or aligning punches 37, 37 spaced in advance of said piercing punches. Said punch spacer is abutted by a clamping member 35 which is also mounted in said channel, as will hereinafter more clearly appear as this specification proceeds.

The channel 33 in the punch shoe 29 also has a clamping member 38 mounted therein and forming a clamping member for a plurality of slitting and bending punches 39, 39 disposed in advance of said piercing and locating punches and on opposite sides of the pierced or slotted portion of the strip for alternately slitting the strip on opposite sides thereof and bending alternate slit tabs 17 of the pierced strip downwardly, leaving alternate tabs 17, 17 extending outwardly from the pierced portion of the strip. Said clamping member also has two finish forming or bending punches 40, 40 mounted therein in alignment with said slitting and bending punches 39, 39 and spaced in advance thereof for effecting the finish bending operation on the strip and forming it into a uniform strip of U-shaped cross section having parallel spaced alternately slit crowns extending along opposite sides of the slotted portion thereof.

The die shoe 31 has an upwardly opening channel 43 extending therealong and having an inner die shoe 41 mounted therein. Said inner die shoe has a longitudinal channel 42 formed therein having two facing die spacers 44 mounted therein and forming spacers for a plurality of piercing dies 45, 45 arranged to register with the piercing punches 36, 36 during the punching operation. Said spacers also form spacers for locating dies 46, 46 for the locating punches 37, 37. Said piercing and locating dies are held in position in said spacer and inner die shoe by retaining or clamping members 49, 49 extending along said spacers and recessed in the channel 42 and engaging shoulder portions 50—50 of said dies. Flat-headed machine screws 51, 51 are provided to secure said retaining members to said spacers. Said spacers 44, 44 are secured to said channel 42 formed in said inner die shoe 41 by machine screws 53, 53 extending through opposite sides of said die shoe and threaded in the sides of said spacers.

The piercing punches 36, 36 are herein shown as abutting a shim 54 which may be of varying thickness to vary the effective length of said punches and which extends partially along the bottom of a punch pad 55 having a vertical leg 56 clamped between the punch spacer 34 and clamping member 35 and secured thereto as by machine screws 57, 57, securing said clamping member and spacer together. An inclined locking bar 59 is adapted to engage inclined notched surfaces 60, 60 formed in said piercing and locating punches. Set screws 61, 61 threaded in said clamping member 35 are provided to engage said locking bar and clamp said piercing and locating punches in said spacer. Said spacer 34 and clamping member 35 are secured to the punch holder 29 in the channel 33 by machine screws 62, 62 extending through the top of said punch holder and recessed therein and threaded in said spacer and clamping member.

Figure 7:
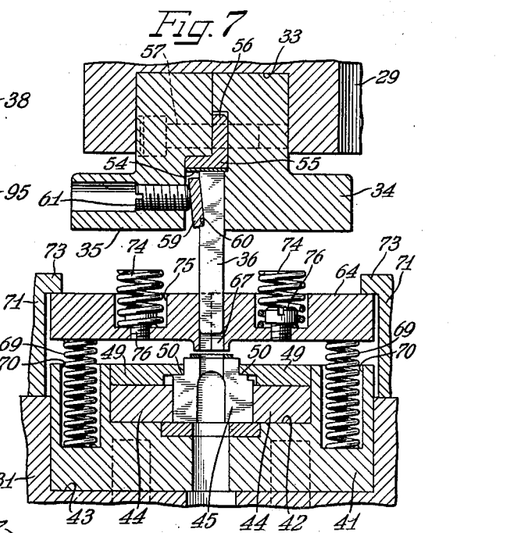
Figure 7 is a fragmentary transverse sectional view taken substantially along line VII—VII of Figure 4.
Figure 8:
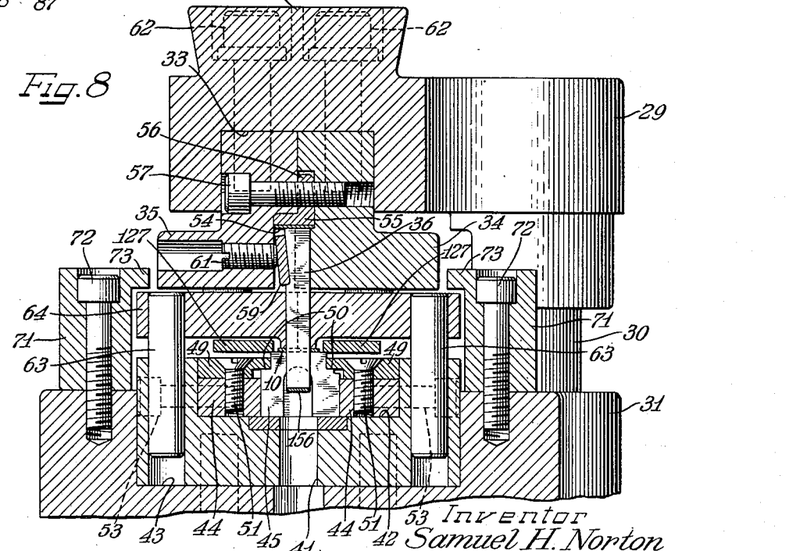
Figure 8 is a fragmentary transverse sectional view taken substantially along line VIII—VIII of Figure 4.

A stripper plate 64 is herein shown as being mounted for vertical floating movement with respect to the inner die 41 on guide pins 63, 63 extending downwardly therefrom and slidably guided in said inner die (Figures 7 and 8). Said stripper plate may be of a split construction with the parts thereof secured together by transversely extending machine screws 65, 65 having a plurality of spaced facing and registering vertically extending slots formed therein to provide piercing and locating punch receiving slots 67, 67 extending along the center of said plate and through which the piercing punches 36, 36 and locating punches 37, 37 may reciprocably move. A plurality of compression springs 69, 69 are seated in upwardly opening spring-receiving sockets 70, 70 formed in said inner die shoe 44 and abut the bottom of said stripper plate 64 to support and urge said stripper plate to move in a direction away from said inner die shoe. Stops 71, 71 extend along opposite sides of said stripper plate and are secured to the die shoe 31 as by machine screws 72, 72. Said stops each has a gib 73 extending inwardly therefrom over the outer end of said stripper plate 64 to limit upward movement thereof. Compression springs 74, 74 are seated in spring-receiving sockets 75, 75 formed in the top of said stripper plate 64 and project upwardly therefrom when free. Said springs are held to said stripper plate by machine screws 76, 76. Said compression springs are heavier than the compression springs 69, 69 and are adapted to be engaged by the bottom of the punch spacer 34 and punch clamp 35 upon downward movement of the punch head 23 to move said stripper plate downwardly into engagement with the flat strip piston ring material and to hold said stripper plate into engagement therewith during the piercing thereof and as said piercing punches are withdrawn therefrom to strip said punches from the pierced material and prevent deformation thereof.

Said compression springs 74, 74 are of sufficient strength to hold said stripper plate in engagement with the strip material as the punch head moves on its return path of travel and until the piercing punches 36, 36 have been stripped from the material.

The locating punches 37, 37 spaced in advance of the piercing punches have lower end portions converging to points and perform no punching function. Said locating punches are mounted in the punch holder 35 in a manner similar to which said piercing punches are mounted therein, and the converging or pointed lower ends thereof are adapted to register with the slots 16, 16 pierced in the piston ring material upon downward movement of said locating punches in advance of said piercing punches to accurately locate the material at the beginning of each feeding operation and thus to assure uniform spacing of the slots pierced therein and also uniform spacing of the succeeding slitting and forming operations.

Figure 9:
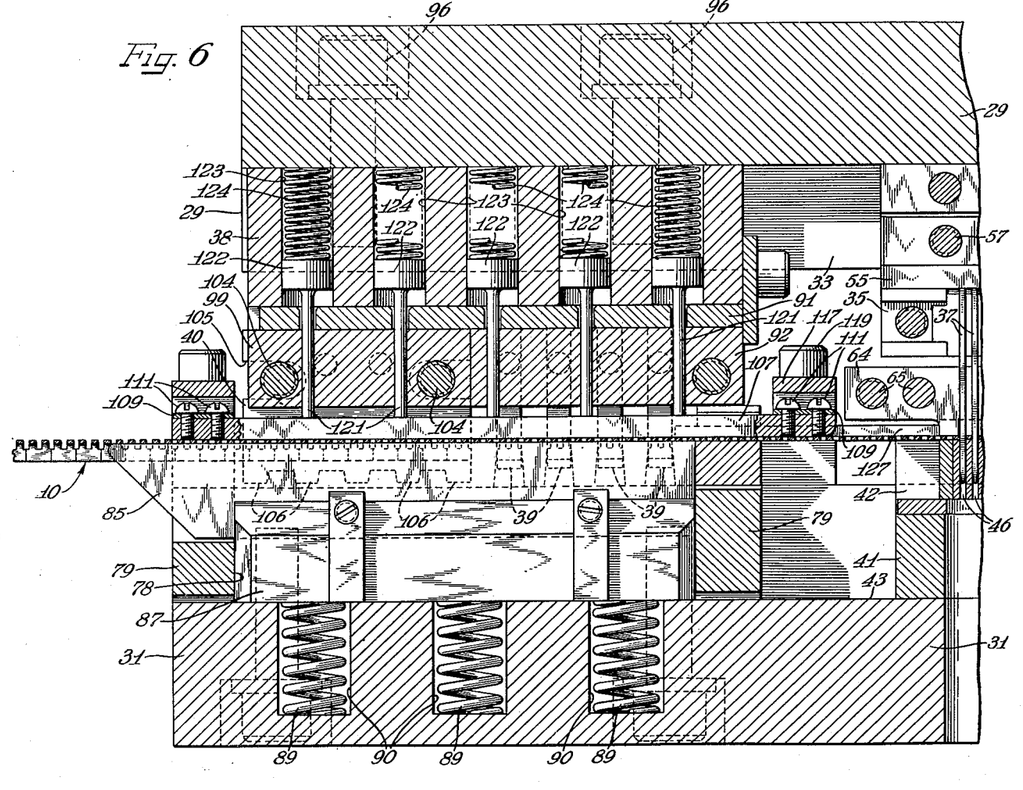
Figure 9 is a fragmentary transverse sectional view taken substantially along line IX—IX of Figure 4.

The channel 43 extending along the die shoe 31 has a die holder 79 mounted therein in advance of the inner die shoe 41 and the piercing and locating dies 45 and 46 respectively. Said die holder 79 has an open central portion 78 and has two similar die plates 80, 80 recessed therein and extending over said open central portion 78 of said die holder and secured to said die holder by machine screws 81, 81. Said die plates are spaced apart at their inner ends and form a support for the strip 10 as it passes therealong. Said die plates 80, 80 have alternately arranged rectangular slots 83, 83 formed therein and opening toward each other, the facing edges of which form slitting dies coacting with the slitting and bending punches 39, 39. The bending punches 39, 39 are arranged to alternately slit opposite sides of the strip and downwardly bend alternate slit portions thereof around a bending bar 85 extending between said die plates and beyond the forward end thereof. The bending bar 85 forms a slidable support and guide for the partially formed and fully formed strip (Figures 6 and 9). The portions of the die plates 80, 80 in advance of the slots 83, 83 open toward each other and form elongated recesses or slots 86, 86 extending along each side of the bending bar 85 and adapted to receive the finish bending dies 40, 40 and the remaining alternate tabs 17 of the strip material bent downwardly by said finish bending dies to form the finished piston ring stock to a uniform U-shaped cross section.

The bending bar 85 is mounted within and extends upwardly from a base 87 mounted in the open central portion 78 of the die holder 79 for limited vertical movement with respect thereto (Figure 6). A plurality of compression springs 89, 89 seated in upwardly opening recesses 90, 90 formed in the die shoe 31 abut the bottom of said base and urge said base and bending bar to move in an upward direction. Vertical movement of said base is limited by the projecting inner ends of the die plates 80, 80.

Figure 10:
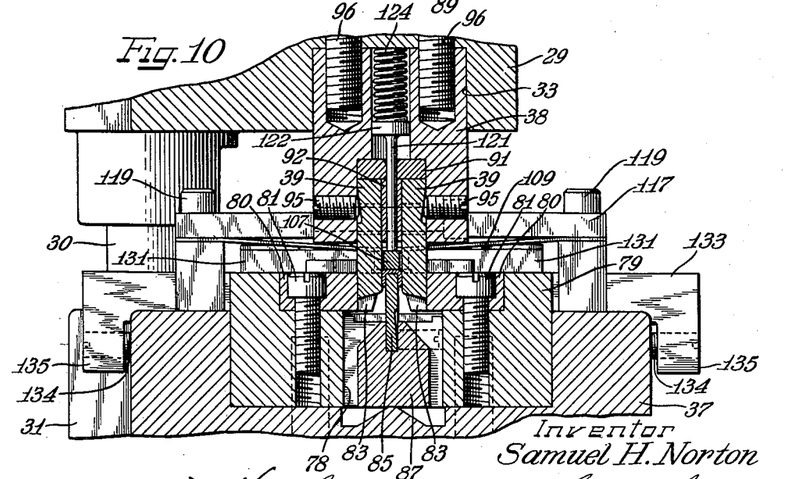
Figure 10 is a fragmentary transverse sectional view taken substantially along line X—X of Figure 4.

The slitting and bending punches 39, 39 mounted in the clamping member 38 abut a punch pad 91 at their upper ends and are laterally and longitudinally spaced apart by means of a spacing member 92 carried within said clamping member (Figures 9 and 10). Said punches are secured to said clamping member by set screws 95, 95 threaded therein and engaging inclined abutment surfaces of said punches. Said spacing and clamping member 38 is secured within the channel 33 by machine screws 96, 96 threaded therein from the top of the punch shoe 29 (Figures 6, 10 and 11).

Figure 11:
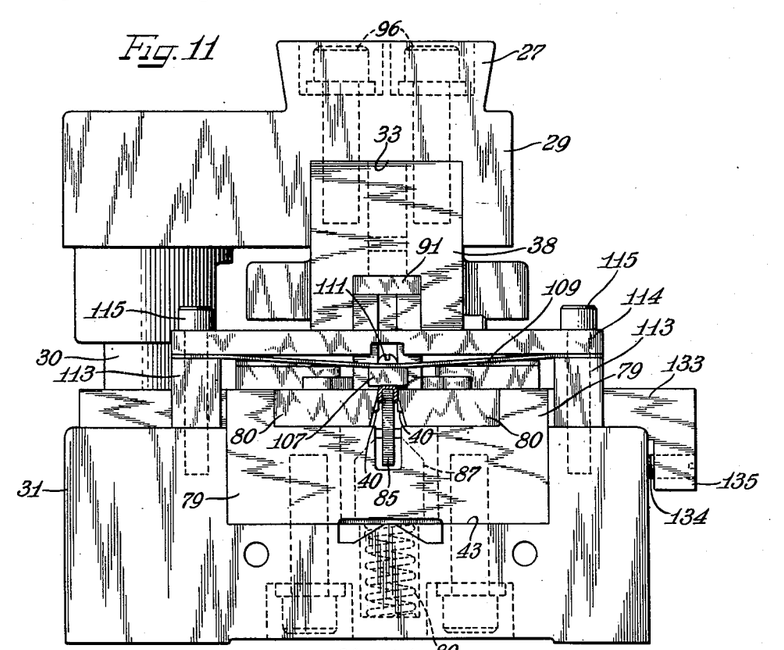
Figure 11 is an enlarged detail end view of the punch and die assembly looking toward the discharge end thereof.

The finish bending punches 40, 40 are mounted in the clamping member 38 in advance of the punches 39, 39 on opposite sides of a spacing member 99 extending from the spacer member 92 toward the discharge end of the machine (Figures 6 and 11). Machine screws 104, 104, extending through the clamping member 38 and threaded in one side thereof and through outwardly facing slotted portions 105, 105 of said punches, serve to secure said punches to said clamping member. Said finish bending punches 40, 40 are notched at their bottoms, and the notched portions thereof open toward the ground to form a plurality of teeth 106, 106 alternately arranged on opposite sides of said spacing bar 99 and engageable with the alternate tabs 17, 17 to bend them downwardly about the bending bar 85 and complete the formation of the piston strip stock.

A straightening bar 107 extends beneath the slitting and bending punches 39, 39 and the finish bending punches 40, 40 for engagement with the top of the slotted strip prior to and during the slitting and forming operations thereon. Said straightening bar may best be seen in Figures 4, 6 and 11 and is yieldably suspended at its opposite ends on leaf springs 109, 109 extending transversely thereof and secured thereto, intermediate their ends, by machine screws 111, 111. The leaf spring 109 at the discharge end of the punch press abuts the tops of laterally spaced upright spacing members 113, 113 at its opposite ends and is secured thereto by means of a retaining member 114 clamped thereto by machine screws 115, 115 extending through said spacing members and threaded in said die shoe. In a like manner the leaf spring 109 yieldably suspending the rear end of said straightening bar is clamped at its ends to the die shoe 31 in vertically spaced relation with respect to the top surface thereof by a retaining member 117 clamped to the ends of said leaf spring by machine screws 119, 119 (Figure 10).

A plurality of spring-pressed plungers 121, 121 are slidably mounted in the clamping member 38 at their upper ends and extend downwardly through the punch pad 91 and the spacing members 92 and 99 between the slitting and bending punches 39, 39 and the forming punches 40, 40 into engagement with the top of the straightening bar 107 to yieldably engage said bar with the strip material during the slitting and bending operations thereof, as the punch head moves toward the die block 31. As herein shown, each of said spring-pressed plungers has a cylindrical head 122 of a piston-like formation slidably mounted in a drilled portion 123 of the clamping member 38. Compression springs 124, 124 mounted in said drilled portions of said clamping member are interposed between the bottom of the channel 33 and the top of the heads 122 to yield upon downward movement of the punch head and to yieldably engage said bending bar with the top of the strip prior to the slitting and bending operations thereof with sufficient force to straighten any bent portion of the strip and to hold said bending bar in engagement with the strip until after the initial slitting and bending operations and said slitting and bending punches have traveled away therefrom. Said bending bar 85, as herein shown, is of a rectangular formation slightly narrower than the web of the strip at the entering end of and beyond the discharge end of the slitting and bending punches 39, 39. The straightening bar 107 has tabs 125, 125 extending alternately outwardly from opposite sides thereof for engagement with the laterally extending tabs 17, 17 of the strip.

Figure 5:
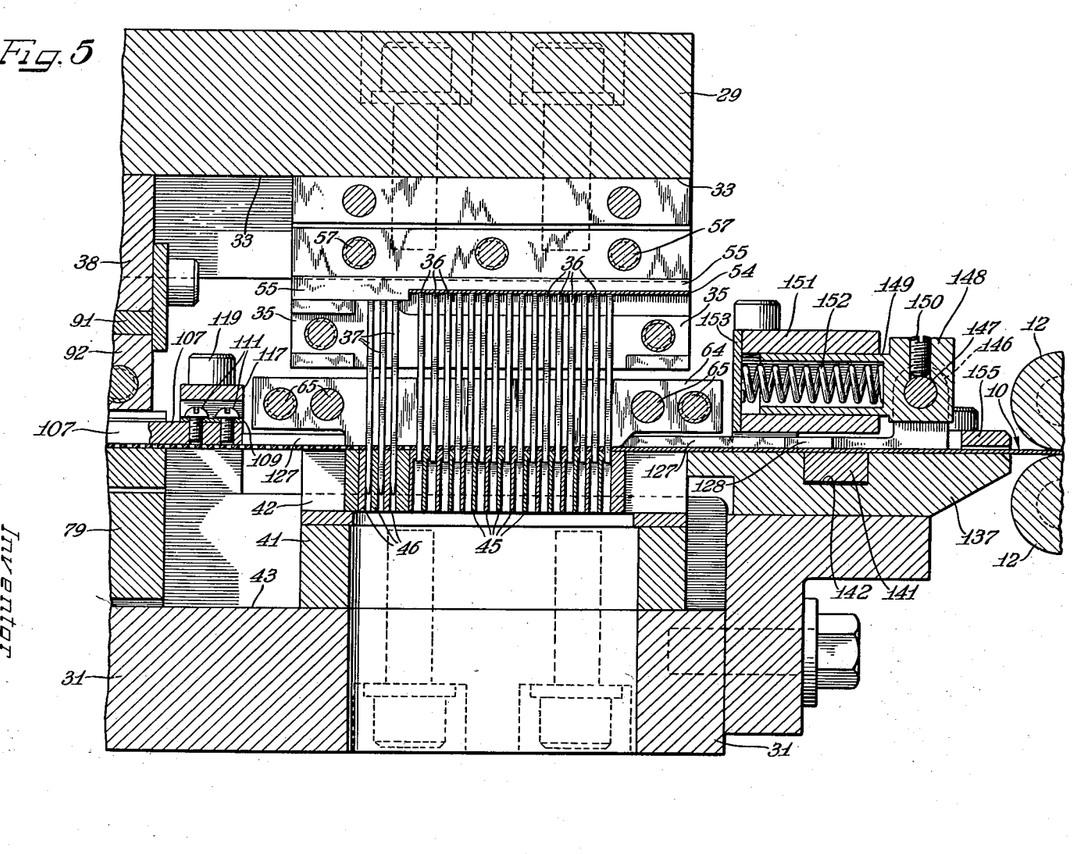
Figure 5 is an enlarged partial longitudinal sectional view taken through the center of a punch and die apparatus and showing the entering end thereof.

The aligning guide for the strip, as it is pierced and passes beneath the piercing punches 36, 36, is arranged to accurately align the strip during the punching and feeding operations with no play and is formed by two laterally spaced guide plates 127, 127 slidably engageable with opposite sides of the strip (Figures 4 and 5). Each guide plate 127 has two longitudinally spaced bearing pads 128, 128 engageable with the strip prior to entering the region of the piercing and locating punches 36 and 37 and after leaving said locating punches. Said guide plates are slidably supported adjacent their discharge ends on the top surface of the slitting and bending die plates 80, 80. Each of said guide plates 127 has an outer vertical inclined engaging surface 129 inclined inwardly from its discharge end toward the strip (Figure 4).

The inclined engaging surfaces 129, 129 of the guide plates 127, 127 are engaged by inclined cam surfaces 130, 130 of laterally spaced cam members 131 having retaining flanges 132, 132 extending over the tops of said guide plates. Said cam members are secured to and project upwardly from the top surface of a transversely adjustable carrier member 133 slidably guided in the die shoe 31. Set screws 134, 134 threaded in opposite depending ends 135, 135 of said carrier member, and engaging the outer sides of said die shoe 31, are provided to adjust said cam members 130, 130 with respect to said die shoe and to center the guide and strip with respect to the respective punches and dies in the assembly. Clamping strips, 136, 136 extending over said carrier member, and clamped in engagement therewith, are provided to retain said carrier member to said guide shoe.

The ends of said guide plates adjacent the entering end of the punch press slidably rest on the top surface of a plate 137 projecting from the entering end of the punch and die shoe 31 and have inclined engaging surfaces 138, 138, like the inclined engaging surfaces 129, 129, which are engaged by similar inclined cam surfaces 139, 139 of cam members 140, 140. Said cam members are mounted on and project upwardly from an adjustable carrier member 141, slidably mounted in a transverse slot 142 formed in the top surface of the plate 137. Said carrier member likewise has depending outer end portions through which extend set screws 144, 144, to afford a means for adjusting the position of said inclined cam surfaces 139, 139 and to center said guide plates 127, 127 with respect to the dies 45, 45. Clamping strips 145, 145 are provided to clamp said carrier member in position.

The ends of guide plates 127, 127 adjacent the entering end of the machine have trunnion supports 146, 146 projecting upwardly therefrom. A transverse pin 147, mounted at its ends in said trunnion supports, is herein shown as extending through a boss 148 formed integrally with the head end of a hollow cylinder 149 and as being secured thereto as by a set screw 150. Said cylinder is slidably mounted within the cylindrical inner portion of a boss 151 for extensible movement therefrom. A spring 152 seated within said cylinder 149 is interposed between the closed head end of said cylinder and a closure plate 153 for said boss, and tends to urge said cylinder 149 and the guide plates 127, 127 toward the entering end of the machine, and thus to move said guide plates along the cam surfaces 130, 130 and 139, 139 in a direction to engage the bearing pads 128, 128 with opposite sides of the strip at points spaced longitudinally therealong. The boss 151 is herein shown as being formed integrally with and projecting upwardly from a bracket 154 secured to the plate 137 on opposite sides of said guide plates 127, 127 and as extending over said guide plates and the strip passing through the punch press.

When the strip is stationary, the guide formed by the guide plates 127, 127 engaging opposite sides of the strip at longitudinally spaced points is thus engaged with the strip to hold it in position with no play, by the compression spring 152 urging said guide plates to move toward the entering end of the machine against the cam surfaces 130, 130 and 139, 139, moving said guide plates 127, 127 into engagement with the strip.

When, however, the strip is fed through the machine by the pinch rolls 12, 12 the tendency will be for the guide plates 127, 127 to move with the strip against the compression spring 152. Movement of said guide plates in this direction will compress said spring and allow said guide plates to move along the cam surfaces 130, 130 and 139, 139 in a direction to release said guide plates from the strip. Under this condition, said guide plates will form a slidable centering guide for the strip and permit the strip to be fed through the punch press against the resistance offered thereto by said guide plates in centered or aligned relation with respect to the piercing and locating punches 36, 36 and 37, 37 and to the slitting and forming punches 39, 39.

A predetermined pressure is thus exerted against opposite sides of the strip during the punching and forming operations when the strip is stationary, which is relieved during feeding movement thereof and is determined by the strength and loading of the spring 152. This guide means therefore offers an automatically equalized resistance against the strip during travel through the machine and forms a self-aligning guide means therefor.

The piston ring stock may be produced by taking a coil of piston ring strip material 10 of the required width and feeding the material through the pinch rolls 12, 12 from a suitable reel (not shown), under a guide strip 155 at the entering end of the machine and along the plate 137 into engagement with the bearing pads 128, 128 of the guide plates 127 holding the strip in centered relation with respect to the piercing punches 36, 36. For the first piercing operation the strip may be trained by hand under said guide strip 155 and between said guides 127, 127 to a point where its leading end is past the last die 45 a distance equal to the space between two slots 16, 16. The guide plates 127, 127 will then hold the strip in position and power may then be turned on the machine to effect the first piercing operation by vertical downward movement of the punch head or ram 23; the punches 36, 36 punching rectangular slugs 156, 156 from the strip at equally spaced intervals through the dies 45, 45 where said slugs may drop through the die assembly to the ground or to a suitable receptacle therefor (Figure 8). After the first punching operation the stripper plate 64 is held in firm engagement with the strip by the springs 74, 74 to strip the piercing punches 36, 36 therefrom and hold the strip from deformation during return travel of said punches. When said punches have moved on their return path a sufficient distance to be free from the strip, the pinch rolls 12, 12 will then be rotatably driven through the eccentric 14 and pawl and ratchet drive 13 to feed the strip longitudinally a distance which may be equal to the distance between the first and last piercing punches 36 plus one space between said punches. Feeding movement of said pinch rolls will then stop, and the punch head 23 will again start in its downward path of travel and force the piercing punches 36, 36 to rectangularly pierce the strip. During this second punching operation, the locating punches come into engagement with the slots 16, 16 pierced in the strip prior to engagement of the piercing punches therewith to accurately locate the strip with respect to said slots and assure an even spacing of the second group of slots pierced in the strip after the second punching operation. The strip may again be advanced through the machine and its leading end may pass beneath the straightening bar 107 in position to be straightened thereby and to be alternately slit and bent on opposite sides of the slots 16, 16 by the slitting and forming or bending punches 39, 39. During this operation, the straightening bar 107 first comes into engagement with the top surface of the strip to straighten any deformation thereof and to hold it from undesired deformation during the slitting and bending operation, said straightening bar serving as a stripper during the return travel of said slitting and bending punches 39, 39. After the initial bending operation, alternate downwardly bent tabs 17, 17 will slidably engage opposite sides of the bending bar 85 which will form a self-aligning guide for the strip as it passes to the discharge end of the punch. During return travel of the punch head 23 the strip will again be advanced a distance which may be determined by the space between the outside of the first and last piercing punches 36, 36 plus the space between two of said punches, and the alternately projecting tabs 17, 17 may then be formed or bent downwardly over the bending bar 85 to form the leading end of the strip into piston ring stock substantially U-shaped in cross section and having a central uniformly slotted web with alternately slit parallel spaced crowns extending along opposite sides thereof and substantially perpendicular to said web 10.

It may be understood from the foregoing that after the leading end of the strip has once been properly formed into piston ring stock of U-shaped cross section that the stock of the proper cross section may be intermittently discharged from the discharge end of the machine and that the piercing, locating, slitting and bending, and finish bending operations are all effected simultaneously upon each downward stroke of the die head 23 at successive points along the strip.

It will be understood that modifications and variations may be effected without departing from the scope of the novel concepts of the present invention.

I claim as my invention:

The method of fabricating a channel shaped ladder-like metal strip which comprises simultaneously piercing a plurality of longitudinally spaced parallel transverse slots along the longitudinal central portion of the advance end of the strip to produce a ladder-like blank with longitudinal side legs and spaced transverse cross portions connecting the legs together in a plurality of successive piercing operations along the length of the strip, and during the second piercing operation locating the strip by engagement with the pierced portions thereof, then advancing the pierced strip and supporting the legs of an advance increment in length of the pierced strip at longitudinally spaced areas and leaving alternate portions of the opposite side legs unsupported in staggered relation with respect to each other, then in a third operation simultaneously piercing and locating the strip by engaging the pierced portions of a next succeeding length of strip and holding down and straightening the supported leg portions and transversely shearing the unsupported leg portions from the supported portions and in the same operation bending the unsupported leg portions to form downwardly bent tabs staggered with respect to each other on each side of the strip, advancing the resulting sheared and alternately bend strip to move the remaining unbent leg portions beyond the supports therefore and during the advancing operation guiding the strip on the alternately bent leg portions, and then in a fourth operation simultaneously piercing and locating next succeeding increments in length of strip and holding down the supported leg portions and shearing and alternately slitting and bending the unsupported leg portions of an increment in length of the strip in advance of the length pierced and at the same time bending the unbent leg portions of an increment in length of the strip in advance of the increment in length being slit and bent into alignment with the bent leg portions of an advance increment in length of the strip to form a channel-like strip, and then continuing advance of the strip and simultaneous piercing, locating, shearing holding down and alternate bending and finish bending and guiding operations at spaced equal increments in length of the strip throughout the length of the strip, to continuously produce a channel-like strip having a ladder-like web and slit legs extending therefrom.

References Cited in the file of this patent

UNITED STATES PATENTS

| | | |
|---|---|---|
| 1,424,831 | Kux | Aug. 8, 1922 |
| 1,915,531 | Irmis | June 27, 1933 |
| 1,925,034 | Fitzgerald | Aug. 29, 1933 |
| 2,043,919 | Bengston | June 9, 1936 |
| 2,201,316 | McGee | May 21, 1940 |
| 2,311,728 | Bowers | Feb. 23, 1943 |
| 2,311,729 | Bowers | Feb. 23, 1943 |